United States Patent
Fenny et al.

(10) Patent No.: US 9,650,128 B2
(45) Date of Patent: May 16, 2017

(54) AIRCRAFT LANDING GEAR

(71) Applicant: Bell Helicopter Textron Inc., Fort Worth, TX (US)

(72) Inventors: Carlos A. Fenny, Fort Worth, TX (US); Brent C. Ross, Flower Mound, TX (US); Kevin Kell, Keller, TX (US); Andrew Baines, Southlake, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 14/599,705

(22) Filed: Jan. 19, 2015

(65) Prior Publication Data

US 2016/0207611 A1    Jul. 21, 2016

(51) Int. Cl.
| | | |
|---|---|---|
| *B64C 25/10* | (2006.01) | |
| *B64C 25/20* | (2006.01) | |
| *B64C 25/12* | (2006.01) | |
| *B64C 25/18* | (2006.01) | |
| *B64C 25/60* | (2006.01) | |

(52) U.S. Cl.
CPC ............ *B64C 25/20* (2013.01); *B64C 25/12* (2013.01); *B64C 25/18* (2013.01); *B64C 25/60* (2013.01)

(58) Field of Classification Search
CPC ........ B64C 25/10; B64C 25/12; B64C 25/20; B64C 2025/10; B64C 2025/12; B64C 2025/125
See application file for complete search history.

(56) References Cited

U.S. PATENT DOCUMENTS

| | | | | |
|---|---|---|---|---|
| 1,496,200 A | * | 6/1924 | Baumann | B64C 25/10 244/102 A |
| 1,718,189 A | * | 6/1929 | Baumann | B64C 25/10 244/102 R |
| 2,021,439 A | * | 11/1935 | Wells | B64C 25/10 244/102 R |
| 5,875,994 A | | 3/1999 | McCrory | |
| 8,556,209 B2 | * | 10/2013 | Luce | B64C 25/14 244/102 SS |
| 2010/0219290 A1 | | 9/2010 | Luce | |

FOREIGN PATENT DOCUMENTS

| | | | | |
|---|---|---|---|---|
| EP | 1902947 A2 | | 3/2008 | |
| GB | 365364 A | * | 1/1932 | ............. B64C 25/10 |

OTHER PUBLICATIONS

Search Report in related European Application No. 15183762.2, dated Nov. 6, 2015, 3 pages.
Office Action in related European Application No. 15183762.2, dated Nov. 27, 2015, 7 pages.

* cited by examiner

*Primary Examiner* — Philip J Bonzell
(74) *Attorney, Agent, or Firm* — Alison A. Woodruff

(57) ABSTRACT

In some embodiments, an aircraft may include a retractable or extendable landing gear. The landing gear may include a wheel connected to an axle, a strut configured to resist longitudinal compression, and a linear actuator that is partially disposed within an opening of the strut.

16 Claims, 8 Drawing Sheets

AIRCRAFT LANDING GEAR

GOVERNMENT RIGHTS

At least some of the subject matter of this application may have been made with government support under W911W6-05-2-0005 awarded by the United States Army's Aviation Applied Technology Directorate under the Joint Heavy Lift Concept Design and Analysis. The government may have certain rights in the invention.

TECHNICAL FIELD

This invention relates generally to an aircraft, and more particularly, to an aircraft landing gear.

BACKGROUND

An aircraft is a machine that is able to fly by gaining support from the air. It counters the force of gravity by using either static lift or by using the dynamic lift of an airfoil. There are different types of aircraft such as fixed-wing aircraft and rotorcraft.

An aircraft may include landing gear that supports the aircraft when it is not flying. The landing gear may allow the aircraft to take off, land, and taxi without damage.

SUMMARY

Particular embodiments of the present disclosure may provide one or more technical advantages. A technical advantage of one embodiment may include the capability to retract or extend landing gear for an aircraft. A technical advantage of one embodiment may be a more aerodynamic design. A technical advantage of one embodiment may be a reduction of the weight of an aircraft. A technical advantage of one embodiment may be an increased absorption of energy.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
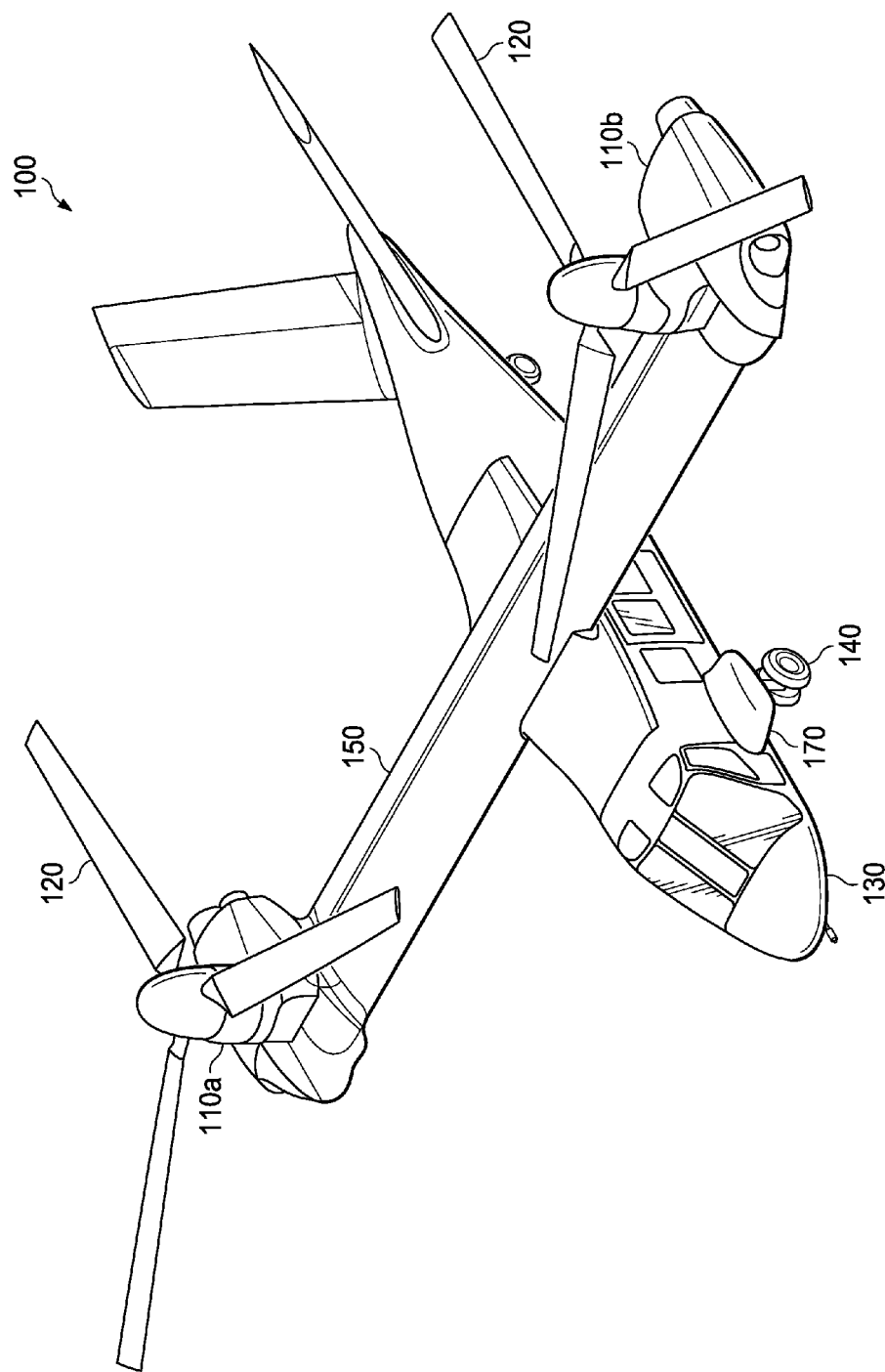
FIG. 1 shows a perspective view of a rotorcraft according to one example embodiment.

FIG. 1 shows an aircraft 100 according to one example embodiment. Aircraft 100 may represent a rotorcraft that features rotor systems 110*a* and 110*b*, blades 120, a fuselage 130, a landing gear 140, and a wing 150.

Rotor system 110 may rotate blades 120. Rotor system 110 may include a control system for selectively controlling the pitch of each blade 120 in order to selectively control direction, thrust, and lift of aircraft 100. In the example of FIG. 1, aircraft 100 represents a tilt-rotor aircraft, and rotor systems 110*a* and 110*b* feature rotatable nacelles. In this example, the position of nacelles 110*a* and 110*b*, as well as the pitch of rotor blades 120, can be selectively controlled in order to selectively control direction, thrust, and lift of aircraft 100.

Fuselage 130 represents the main body of aircraft 100 and may be coupled to rotor system 110 (e.g., via wing 150) such that rotor system 110 and blades 120 may move fuselage 130 through the air.

In the example of FIG. 1, aircraft 100 may operate in a helicopter mode by tilting the nacelles upright and in an airplane mode by tilting the nacelles forward. Aircraft 100 may generate greater forward speed in airplane mode than in helicopter mode because, in airplane mode, blades 120 may be oriented to generate greater thrust propelling the aircraft forward (somewhat analogous to a propeller).

Figure 2:
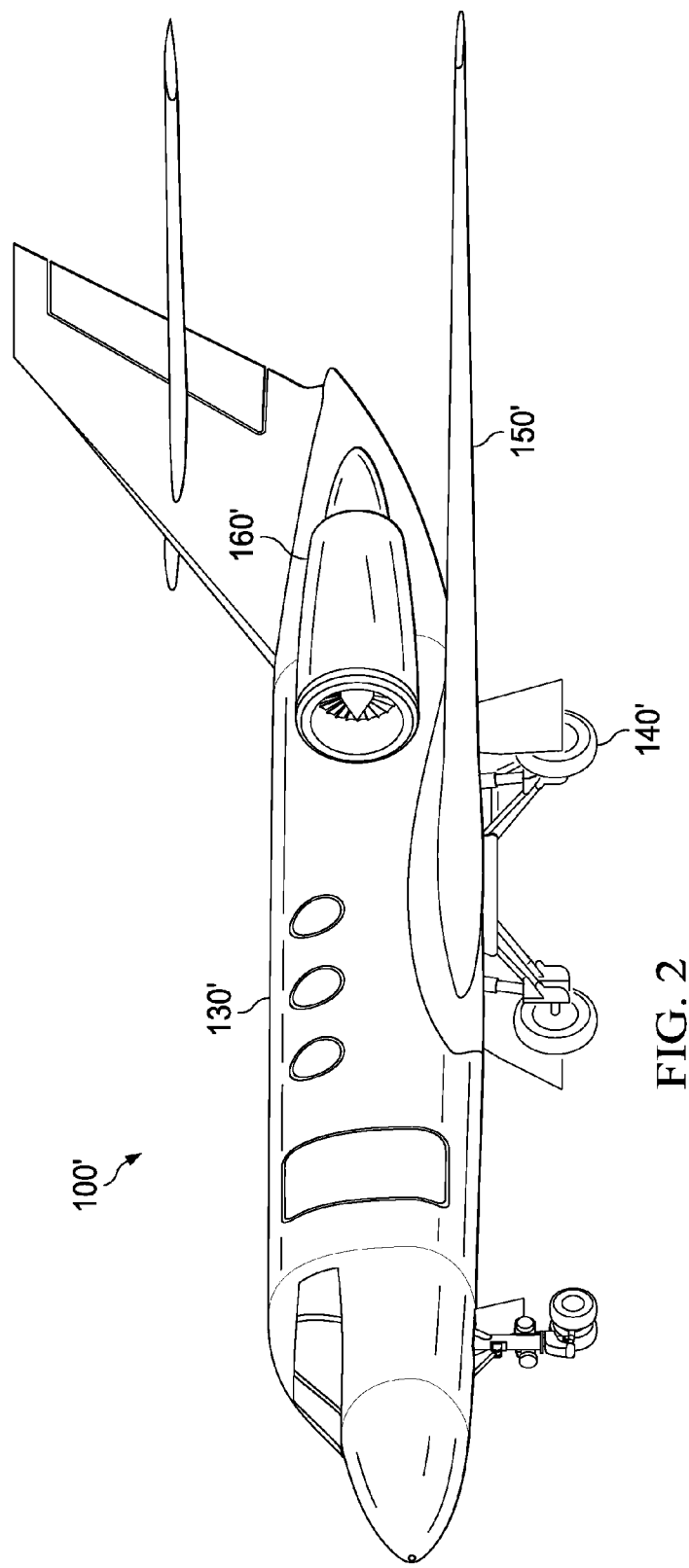
FIG. 2 shows a perspective view of an airplane according to one example embodiment.

Now referring to FIG. 2, aircraft 100' represents a fixed-wing airplane. Aircraft 100' may represent a fixed-wing airplane that features a fuselage 130', a landing gear 140', a wing 150', and an engine 160'. One or more engine 160' may propel aircraft 100' through the air by generating forward thrust.

Teachings of certain embodiments relating to rotor systems described herein may apply to rotor system 110 and/or other rotor systems, such as non-tilting rotor and helicopter rotor systems. It should also be appreciated that teachings from aircraft 100 may apply to aircraft other than rotorcraft, such as fixed-wing airplanes, such as aircraft 100', and unmanned aircraft, to name a few examples.

One or more landing gear 140 may support aircraft 100 when aircraft 100 is landing and/or when aircraft 100 is at rest on the ground. Landing gear 140 may allow aircraft 100 to take off, land, and taxi without damage. Landing gear 140 may be configured to retract fully or partially into wing 150, sponson 170, or fuselage 130 to reduce air resistance or drag. Landing gear 140 may be operated in a variety of ways, including hydraulically, electrically, or manually.

There are different types of landing gear designs that may be used in aircraft. These types include the trailing arm, pivot gear, swing trunnion, and four-bar configuration. All of these different types of landing gear designs may have certain disadvantages. For example, the main disadvantage of the trailing arm landing gear may be that it requires relatively more space for retraction than other designs since during retraction the landing gear swings in an arc and its final displacement may be limited and primarily only vertical. Therefore, this configuration may require the installation of large sponsons to the aircraft resulting in increased aerodynamic drag.

The pivot gear, swing trunnion, and four-bar configurations may also have disadvantages. In each of these configurations, retraction displacement and shock strut stroke may be limited by the envelope and load path required by the linear actuator and shock strut. These limitations may increase both weight and aerodynamic drag.

Figure 3:
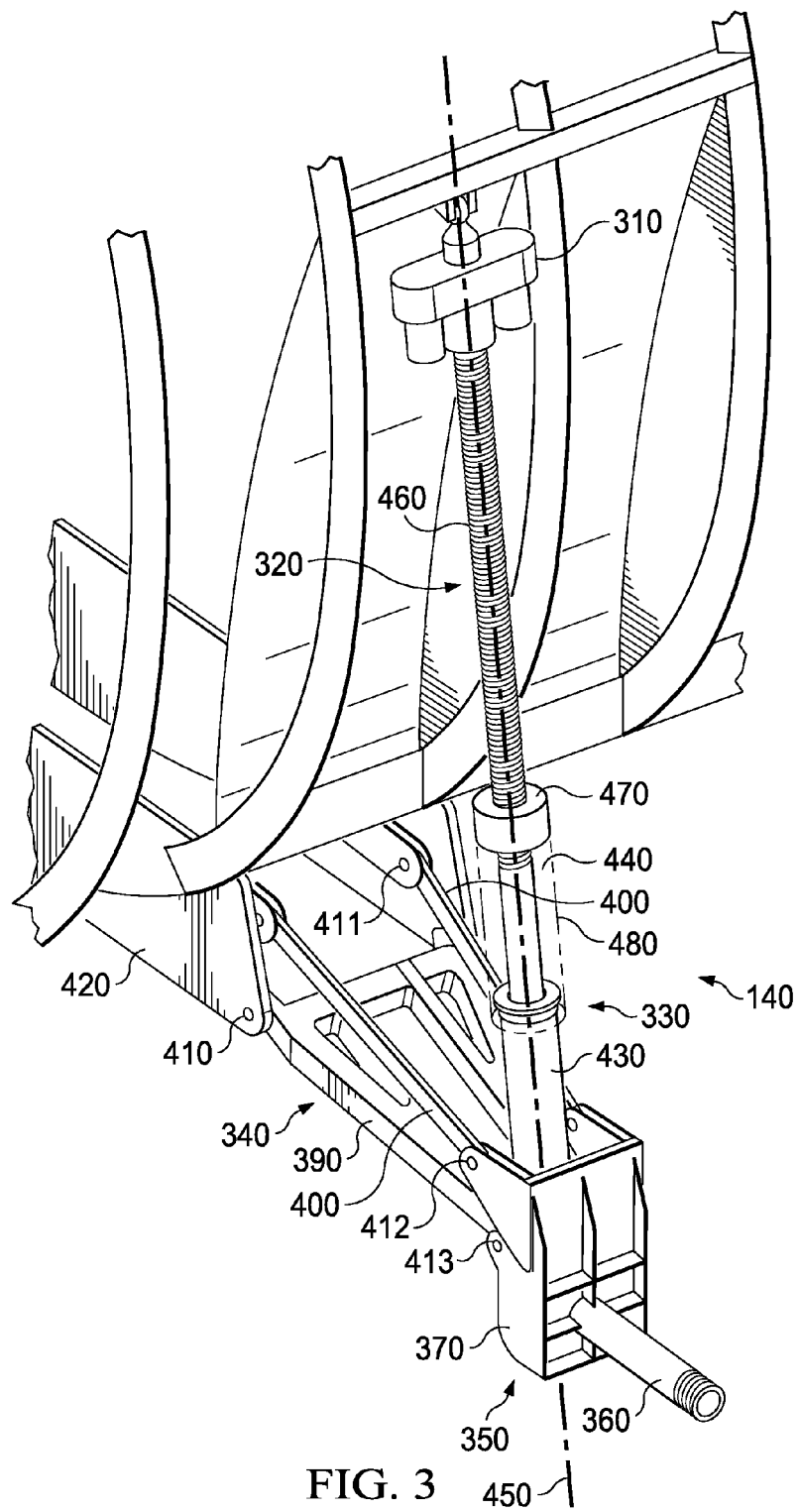
FIG. 3 shows a perspective view of a landing gear according to one example embodiment.

Teachings of certain embodiments recognize the capability to provide a landing gear that reduces weight and decreases aerodynamic drag. Additionally, teachings of certain embodiments recognize the ability for the landing gear to have a wide deployed stance. For example, FIG. 3 shows an example embodiment of landing gear 140 that may be used on an aircraft, such as aircraft 100 or 100'. Landing gear 140 may be placed sufficiently outboard of fuselage 130 to ensure stability of the aircraft during ground operation. The location of landing gear 140 on fuselage 130 may be optimized to allow an efficient path for transferring load to fuselage 130. Alternatively, landing gear 140 may be mounted on wing 150. In a third example, landing gear 140 may be mounted within sponson 170.

Landing gear 140 may include a motor 310, a linear actuator 320, a strut 330, a brace assembly 340, and a wheel assembly 350. Wheel assembly 350 may include one or more axles 360, wheel fittings 370, and wheels 380. Wheel assembly 350 may be attached to the frame of fuselage 130 by brace assembly 340.

Brace assembly 340 may include one or more lower A-frames 390 and one or more upper links 400, and each may be attached to wheel assembly 350 with one or more hinges 410-413. Hinges 410-413 may represent any device that is capable of allowing two objects to rotate relative to each other about a fixed axis of rotation. Lower A-frame 390 and upper link 400 may be made out of metal, such as aluminum or steel.

Lower A-frame 390 and wheel assembly 350 may be connected via hinge 413 so that lower A-frame 390 rotates relative to brace assembly 340 about a fixed axis of rotation; upper links 400 and wheel assembly 350 may be connected with hinge 412 so that upper links 400 rotate relative to brace assembly 340 about a fixed axis of rotation.

Lower A-frame 390 and upper links 400 may also be attached to support 420 with hinges 410 and 411. Support 420 may also be made out of metal, such as aluminum or steel. Support 420 may connect to fuselage 130.

Also attached to wheel assembly 350 may be a strut 330. Strut 330 may represent any component that is capable to resist longitudinal compression along axis 450. For example, strut 330 may be an oleo strut that is an air-oil hydraulic shock absorber that is commonly used on the landing gear of aircraft, such as aircraft 100 or 100'. Strut 330 may cushion the impact of landing the aircraft, or may dampen vertical oscillations.

Strut 330 may consist of a piston 430, which may be an inner metal tube that is attached to wheel assembly 350. Piston 430 may move up and down in housing 480, which may be an outer metal tube. Chamber 440 within strut 330 may be filled with a gas, such as nitrogen, and an oil, such as hydraulic fluid. Chamber 440 may be divided into two or more sub-chambers that fluidly communicate with each other through an orifice.

When an aircraft, such as aircraft 100 or 100', is stationary and on the ground, its weight may be supported by the compressed gas in chamber 440. During landing, or when the aircraft taxis over bumps, piston 430 may slide up and down. It may compress the gas, which acts as a spring, and may force oil through the orifice, which acts as a damper.

Strut 330 may also have an opening within that allows shaft 460 of linear actuator 320 to move through the strut 330 along axis 450. In one example, shaft 460 of linear actuator 320 moves completely through strut 330. Linear actuator 320 may be any device that translates rotational motion to linear motion. For example, linear actuator 320 may be a ball screw assembly or a roller screw assembly. Linear actuator 320 may include a shaft 460 that may be threaded and may also be rotated by motor 310. Motor 310 may be operated in a variety of ways, including electrically, hydraulically, or manually.

Linear actuator 320 may also include a ball nut 470 that may be attached to strut 330. Ball nut 470 may include balls that roll between the grooves created by threads on shaft 460. As shaft 460 rotates, the balls may be rolled along the threads causing ball nut 470 to move up or down shaft 460, depending on the direction of rotation of shaft 460. Since ball nut 470 may be attached to strut 330, strut 330 may also be transposed up and down, along axis 450.

Figure 4:
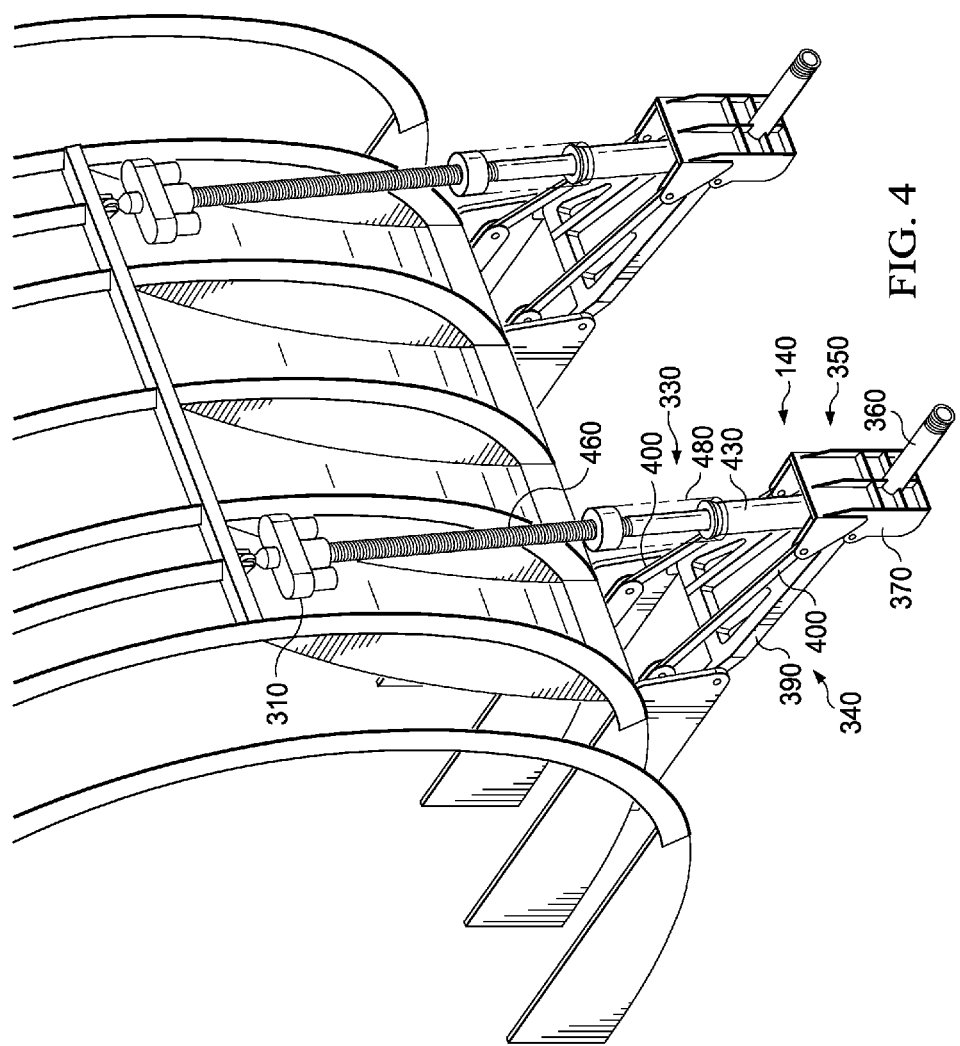
FIG. 4 shows a perspective view of an extended landing gear according to one example embodiment.
Figure 5:
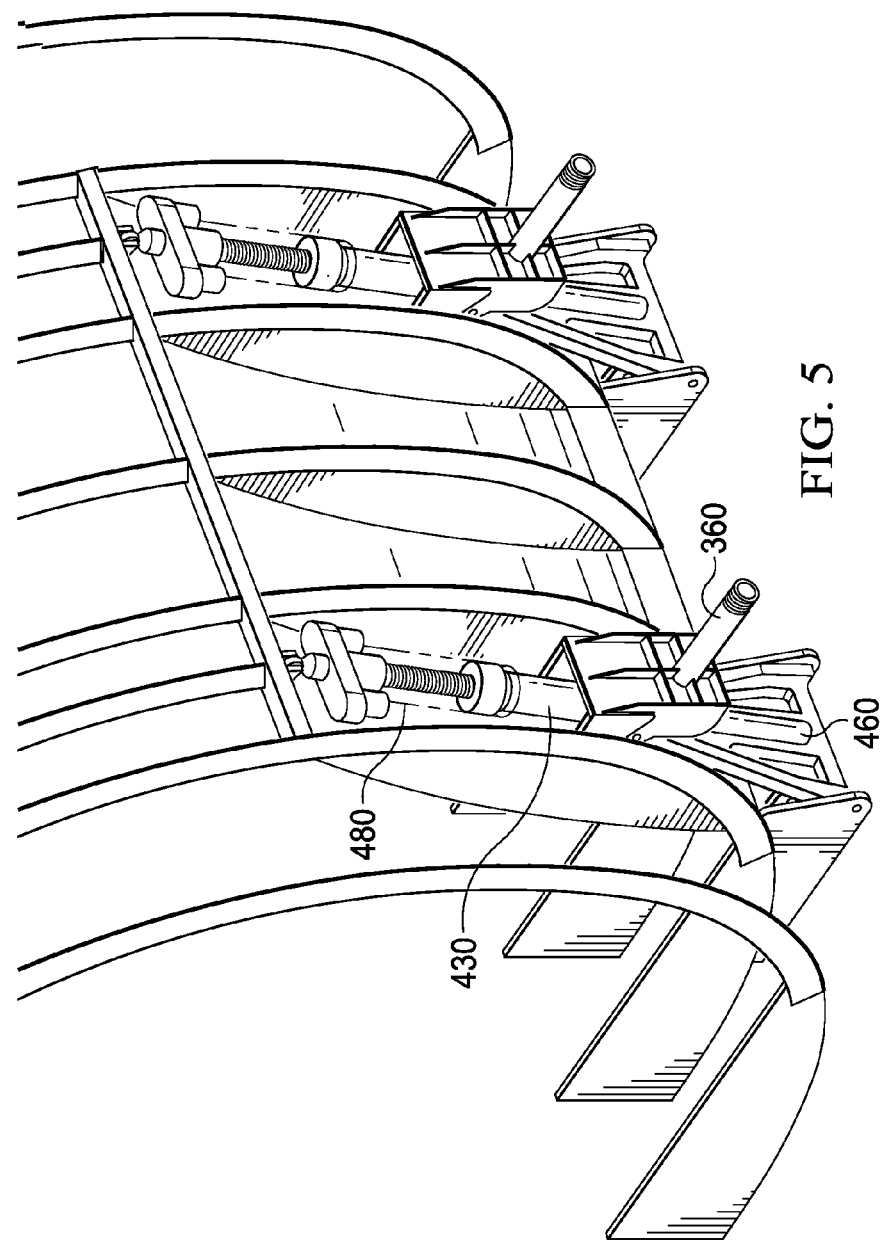
FIG. 5 shows a perspective view of a retracted landing gear according to one example embodiment.

As seen in FIG. 4, landing gear 140 may be retracted by operation of motor 310 that rotates shaft 460. The rotation of shaft 460 causes both strut 330 and wheel assembly 350 to move up along axis 450. Since the components of brace assembly 340 may be hinged to wheel assembly 350, brace assembly 340 pivots and allows landing gear 140 to be stowed within fuselage 130, wing 150, or sponson 170, as seen in FIG. 5.

When landing gear 140 is retracted and stowed, the rotation of shaft 460 may be halted. As seen in FIGS. 6A-6D, landing gear 140 may then be extended by rotating shaft 460 in the opposite direction.

Figure 6A:
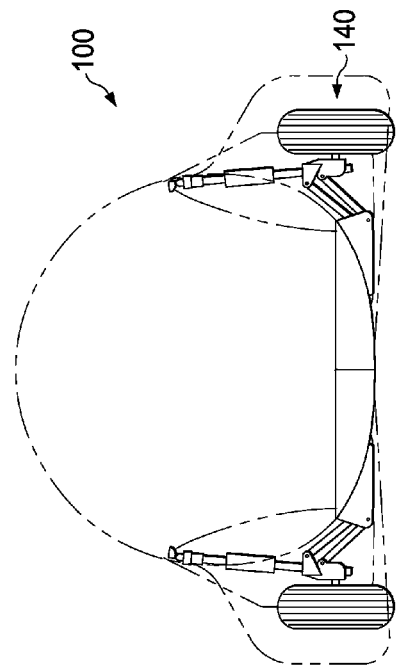
FIGS. 6A-6D shows a cross section of an aircraft according to one example embodiment.
Figure 6B:
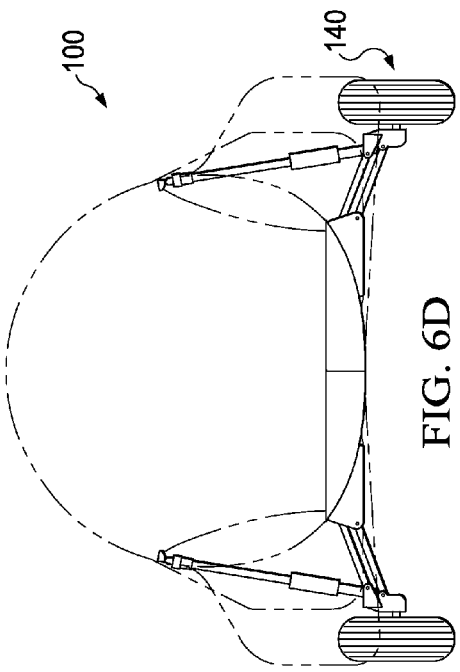
Figure 6C:
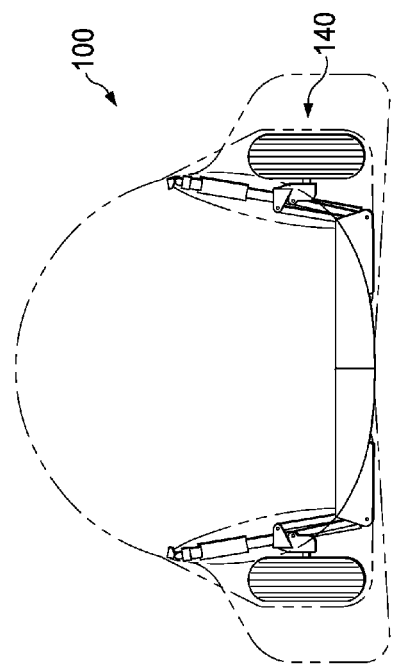
Figure 6D:
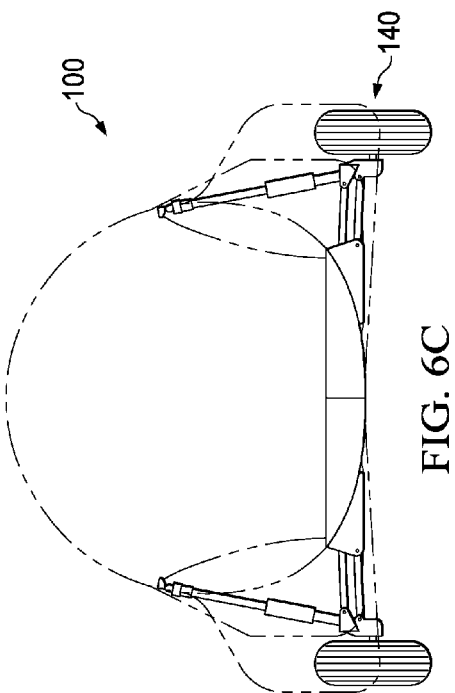

In one example embodiment, landing gear 140 may be partially retracted in order to allow an aircraft such as aircraft 100 or 100' to kneel while stationary on the ground, as seen in FIGS. 6B-6C. Kneeling of an aircraft such as aircraft 100 or 100' may lower the aircraft closer to the ground but may still allow landing gear 140 to support the aircraft. The kneeling of the aircraft may facilitate safe and efficient loading or unloading of passengers or cargo. Additionally, kneeling of an aircraft such as aircraft 100 or 100' may facilitate loading and unloading on damaged or unprepared runways.

In yet another example embodiment, landing gear 140 may be hiked. Generally, the hiking of a landing gear corresponds to an increase in the height of the aircraft in relation to the ground. Accordingly, if landing gear 140 is a nose landing gear system, the nose of the aircraft will be raised with respect to the ground. Provided the rear landing gear system of the aircraft remains unchanged, the aircraft may have a nose-up pitch configuration. The nose-up position may result in an increased lift for the wings of aircraft 100 or 100' while the aircraft is taking off.

Figure 7:
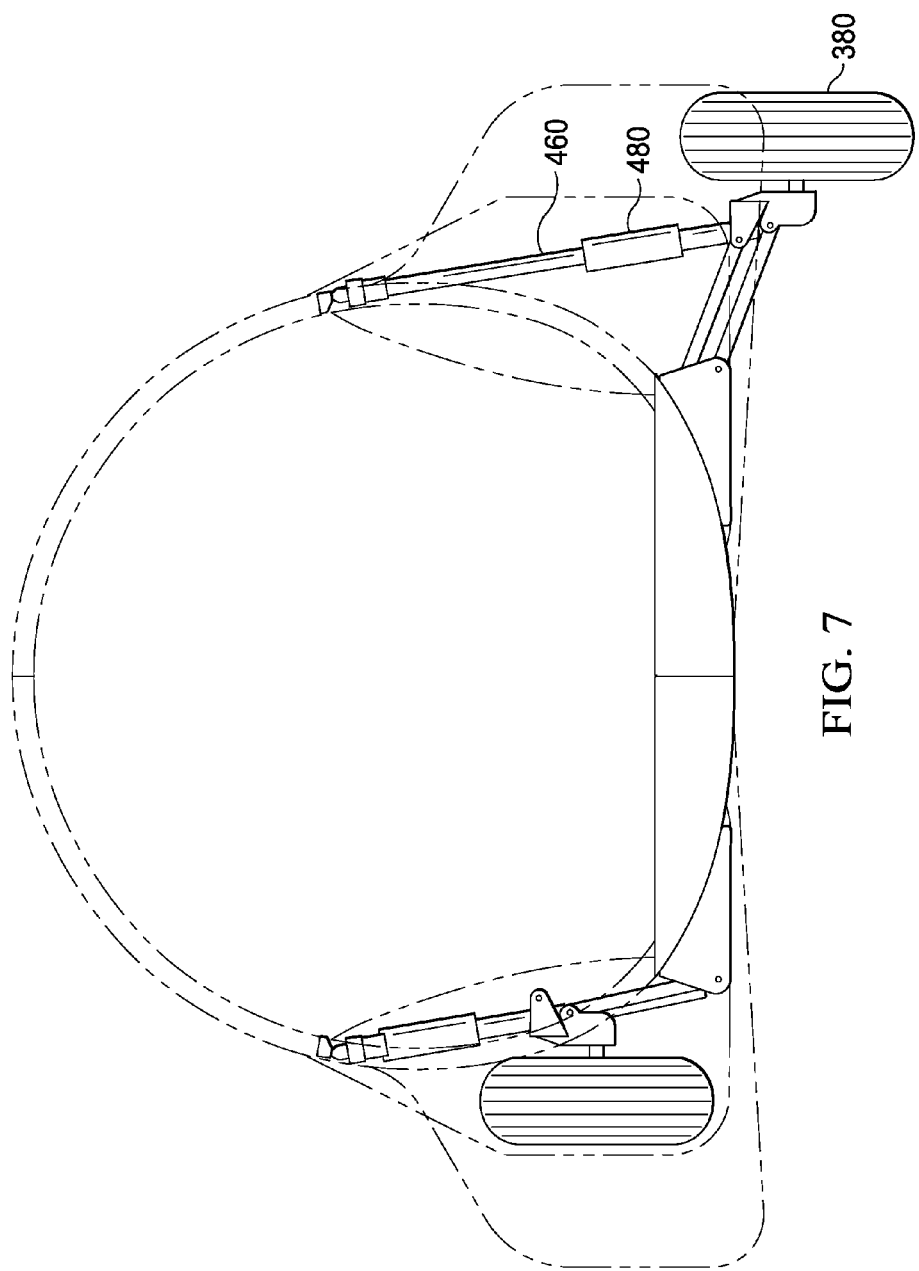
FIG. 7 shows a cross section of an aircraft according to one example embodiment.
Figure 8:
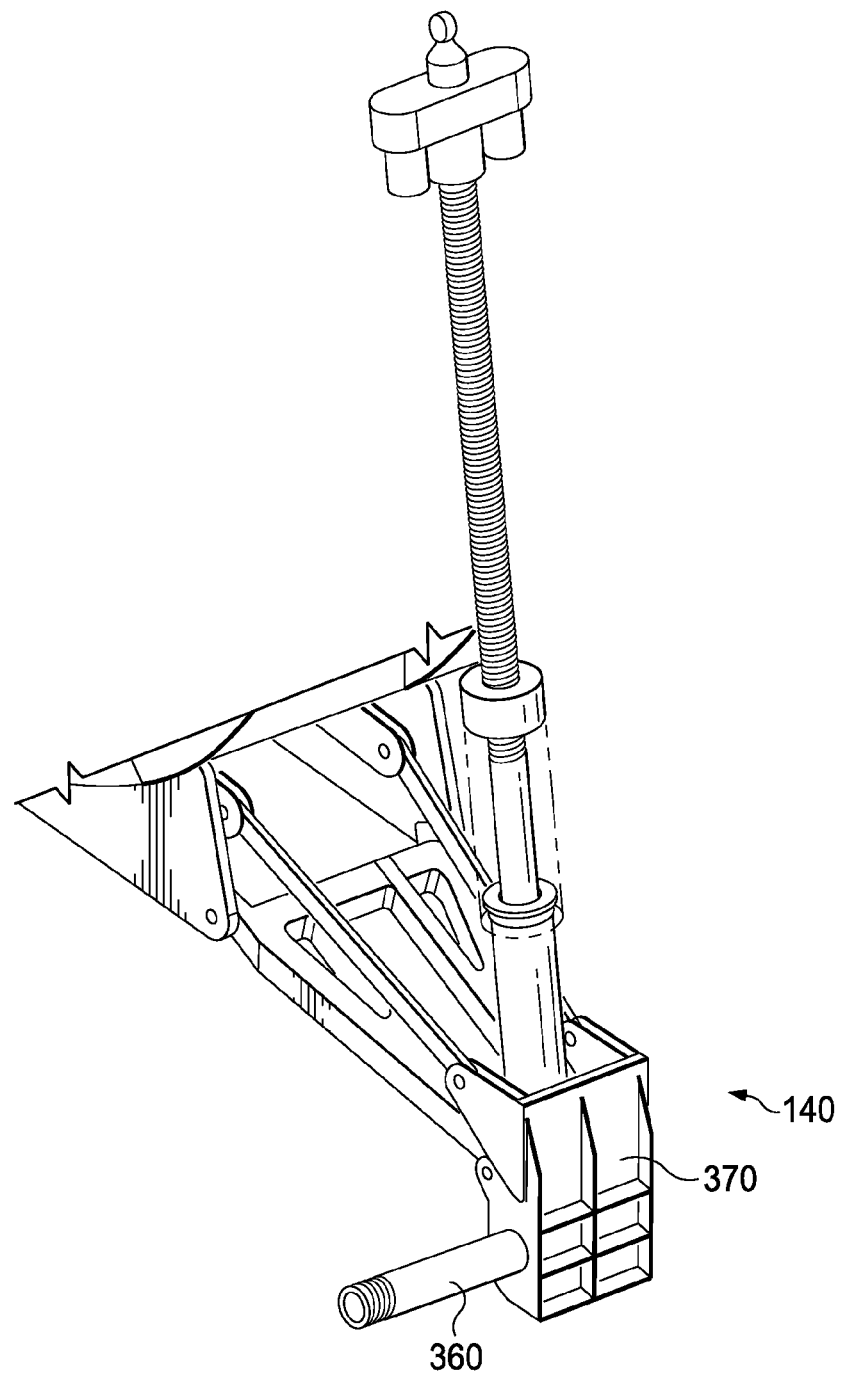
FIG. 8 shows a perspective view of an extended landing gear according to one example embodiment.

Other example embodiments exist for landing gear 140. For example, landing gear 140 may be configured so that shaft 460 does not pass through strut 330. Instead, shaft 460 may remain stationary in relation to strut 330, but may move through motor 310, along axis 450. Another example embodiment may be that two or more landing gears 140 can be operated independently, as seen in FIG. 7. Another example embodiment may be that axle 360 and wheel 380 are located in alternative locations on wheel fitting 370. One example of an alternative location of axle 360 is shown in FIG. 8.

Another example embodiment may be the ability of landing gear 140 to increase absorption of energy. For example, ball nut 470 may be allowed to slip and move along shaft 460. On hard landings, this may result in additional attenuation of landing gear 140. The additional attenuation cushions the impact of landing an aircraft, such as aircraft 100 or 100'.

It should be recognized that landing gear 140 may be scaled for the size, weight, or type of use of the aircraft. Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A landing gear for an aircraft, the landing gear comprising:
    a wheel in mechanical communication with an axle forming a wheel assembly;
    a strut coupled to the wheel assembly and configured to resist longitudinal compression along a first axis, the strut comprising:
        a piston having an opening therein; and
        a housing associated with the piston; and
    a linear actuator comprising:
        a one-piece elongated shaft at least partially disposed within the opening of the piston; and
        a motor operable to reposition the strut by rotating the elongated shaft;
    wherein the piston and the one-piece elongated shaft are substantially centered on the first axis.

2. The landing gear of claim 1, wherein the piston comprises an elongated tube, and the opening is oriented such that the first axis passes through the opening.

3. The landing gear of claim 1, wherein the piston is coupled to the wheel assembly.

4. The landing gear of claim 1, wherein the opening of the piston allows the elongated shaft to move at least partially through the piston.

5. The landing gear of claim 1, wherein the elongated shaft comprises a threaded surface, and the linear actuator further comprises a ball nut disposed about the threaded surface and coupled to the strut.

6. The landing gear of claim 1, wherein the motor rotates the elongated shaft relative to the strut.

7. The landing gear of claim 1, further comprising a support structure comprising:
    a first end configured to pivot relative to a second axis that is substantially perpendicular to the first axis; and
    a second end configured to pivot relative to a third axis that is substantially parallel to the second axis.

8. The landing gear of claim 1, wherein the piston has a second opening that allows the elongated shaft to move completely through the piston.

9. An aircraft comprising:
    a body;
    a landing gear coupled to the body, the landing gear comprising:
        a wheel in mechanical communication with an axle forming a wheel assembly;
        a strut coupled to the wheel assembly and configured to resist longitudinal compression along a first axis, the strut comprising:
            a piston having an opening therein; and
            a housing associated with the piston; and
        a linear actuator comprising:
            a one-piece elongated shaft at least partially disposed within the opening of the piston; and
            a motor operable to reposition the strut by moving rotating the elongated shaft;
        wherein the piston and the one-piece elongated shaft are substantially centered on the first axis.

10. The aircraft of claim 9, wherein the piston comprises an elongated tube, and the opening is oriented such that the first axis passes through the opening.

11. The aircraft of claim 9, wherein the piston is coupled to the wheel assembly.

12. The aircraft of claim 9, wherein the opening of the piston allows the elongated shaft to move at least partially through the piston.

13. The aircraft of claim 9, wherein the elongated shaft comprises a threaded surface, and the linear actuator further comprises a ball nut disposed about the threaded surface and coupled to the strut.

14. The aircraft of claim 9, wherein the motor rotates the elongated shaft relative to the strut.

15. The aircraft of claim 9, further comprising a support structure comprising:
    a first end configured to pivot relative to a second axis that is substantially perpendicular to the first axis; and
    a second end configured to pivot relative to a third axis that is substantially parallel to the second axis.

16. The aircraft of claim 9, wherein the piston has a second opening that allows the elongated shaft to move completely through the piston.

* * * * *